United States Patent [19]
Ghosh et al.

[11] Patent Number: 5,910,856
[45] Date of Patent: Jun. 8, 1999

[54] INTEGRATED HYBRID SILICON-BASED MICRO-REFLECTOR

[75] Inventors: Syamal K. Ghosh, Rochester; Edward P. Furlani, Lancaster; Dilip K. Chatterjee, Rochester, all of N.Y.

[73] Assignee: Eastman Kodak Company, Rochester, N.Y.

[21] Appl. No.: 09/061,619

[22] Filed: Apr. 16, 1998

[51] Int. Cl.⁶ .................................................. G02B 26/00
[52] U.S. Cl. ........................ 359/291; 359/290; 359/224; 359/230; 264/657
[58] Field of Search ..................... 359/290, 291, 359/294, 298, 221, 224, 230; 264/657

[56] References Cited

U.S. PATENT DOCUMENTS

| | | | |
|---|---|---|---|
| 4,786,149 | 11/1988 | Hoenig et al. | 359/290 |
| 5,061,049 | 10/1991 | Hornbeck | 359/224 |
| 5,172,262 | 12/1992 | Hornbeck | 359/230 |
| 5,331,454 | 7/1994 | Hornbeck | 359/224 |
| 5,424,866 | 6/1995 | Kikinis | 359/292 |
| 5,579,151 | 11/1996 | Cho | 359/291 |
| 5,793,519 | 8/1998 | Furlani et al. | 359/291 |

*Primary Examiner*—Loha Ben
*Attorney, Agent, or Firm*—Raymond L. Owens

[57] ABSTRACT

A light reflective device including an insulative substrate; a silicon wafer positioned over the insulative substrate and defining an opening and having a flexible beam portion having top and bottom surfaces which extend into the opening; a layer of ferromagnetic material formed over the top surface of the flexible beam portion; a reflector formed over the ferromagnetic layer on the top surface of the flexible beam portion; and a micro-electromagnet mounted on the insulative substrate relative to the opening of the silicon wafer and adapted to produce a magnetic field in response to an applied current which acts on the ferromagnetic layer to cause the bending of the flexible beam portion, ferromagnetic layer and reflector.

3 Claims, 3 Drawing Sheets

INTEGRATED HYBRID SILICON-BASED
MICRO-REFLECTOR

CROSS REFERENCE TO RELATED APPLICATIONS

Reference is made to commonly-assigned U.S. patent application Ser. No. 08/749,715 filed on Nov. 15, 1996, entitled "Micromolded Integrated Ceramic Light Reflector" by Furlani et al, now U.S. Pat. No. 5,793,519, U.S. patent application Ser. No. 08/752,134 filed on Nov. 21, 1996, entitled "Radiation Reflector" by Furlani et al, U.S. patent application Ser. No. 08/722,598 filed on Sep. 27, 1996, entitled "Integrated Microminiature Electromechanical Radiation Shutter" by Furlani et al, now abandoned, U.S. patent application Ser. No. 08/795,332 filed on Feb. 4, 1997, entitled "Method and Apparatus for the Formation and Polarization of Micromagnets" by Furlani et al, U.S. patent application Ser. No. 08/868,098 filed on Jun. 3, 1997, entitled "A Micromotor in a Ceramic Substrate" by Furlani et al, now U.S. Pat. No. 5,783,879, and U.S. patent application Ser. No. 08/808,896 filed on Feb. 28, 1997, entitled "A Method of Making a Microceramic Electromagnetic Light Shutter" by Ghosh et al, the teachings of which are incorporated herein.

FIELD OF THE INVENTION

This invention relates to micro reflector devices which uses a reflector movable between different positions.

BACKGROUND OF THE INVENTION

Conventional electromagnetic light reflectors consist of flexible members that move relative to an incident light beam to reflect light at a predetermined angle. For magnetically based devices, the movement of the reflectors is usually due to interactions of energized coils with permanent magnets arranged in close proximity to one another. For electrostatically based devices the movement of the reflectors is usually due to the interactions of the charged electrodes arranged proximate to one another.

Texas Instruments produces a Digital Micromirror Device™ (DMD) wherein each DMD pixel is monolithically integrated MEMS (microelectromechanical systems) superstructure cell fabricated over a CMOS SRAM cell. Plasma etching a sacrificial layer develops air gaps between the metal layers of the superstructure of the silicon chip. The air gaps free the structure to rotate about two compliant torsion hinges. The mirror is connected to an underlying yoke which in turn is suspended by two thin torsion hinges to support posts. The yoke is electrostatically attracted to the underlying yoke address electrodes. The mirror is electrostatically attracted to mirror address electrodes. The mirror and yoke rotate until the yoke comes to rest against mechanical stops that are at the same potential as the yoke.

Micro-engineering (MEMS) is a rapidly growing field which is impacting many applications today. Micro-engineered devices and systems involving silicon planar technology can be mass produced with features from one to a few hundred microns having tolerances in micron or submicron level. Most of the current micro-engineering technologies are evolved from the adaptation of thin films, photolithographic and etching technologies generally applied to silicon wafers on which silicon monoxide, silicon dioxide, silicon nitride and the like thin films are deposited and etched thereafter yielding planar configuration. Although the planar silicon technology is capable of building a three dimensional array, the process steps involved in building those structures are many and very often exceed 20 to 30 steps thus making the process less attractive for many applications. Furthermore, there are many complicated structures which are not possible to be incorporated in the silicon planar technology because of certain limitations of the thin film technology.

Although micromolding ceramic reflectors can be automated and made cost-effectively, incorporation of electronic circuitry on ceramic substrates are not that cost effective as silicon technology.

The current planar technologies using silicon substrates are inadequate for the fabrication of an integrated and self-contained three dimensional arrays of micro-devices such as microreflectors which can be used for displaying images. Thin film technology along with etching processes which are used to build three dimensional structures on a silicon wafer have many limitations. One of the greatest drawbacks of the silicon technology is that it is not possible to build a buried helical coil or a uniform vertical cylindrical column having higher length to radius aspect ratio, and similar complex configurations. Furthermore, building three dimensional multilayered structures using thin film technology involves multiple process steps and therefore makes this process not economically feasible.

SUMMARY OF THE INVENTION

It is an object of the present invention to provide a micro-reflective device which can effectively move a reflector between two or more positions.

A further object of the present invention is to provide a micro-reflective device which uses silicon wafer technology in conjunction with ceramic micromolding technology.

These objects are achieved in a light reflective device comprising:

(a) an insulative substrate;

(b) a silicon wafer positioned over the insulative substrate and defining an opening and having a flexible beam portion having top and bottom surfaces which extend into the opening;

(c) a layer of ferromagnetic material formed over the top surface of the flexible beam portion;

(d) a reflector formed over the ferromagnetic layer on the top surface of the flexible beam portion; and (e) a micro-electromagnet mounted on the insulative substrate relative to the opening of the silicon wafer and adapted to produce a magnetic field in response to an applied current which acts on the ferromagnetic layer to cause the bending of the flexible beam portion, ferromagnetic layer and reflector.

This invention overcomes the problems associated with the planar silicon technology and can effectively be used to produce a light reflector. The light reflector is very small in size and can be characterized as a micro-device. This invention offers a unique solution to the conventional silicon technology by integrating the micro-molded three dimensional monolithic components within a silicon wafer. The micro-molding technology is made possible by designing and fabricating molding tools using non-silicon based MEMS technology.

Further advantages of the invention include:

1. Cost-effective manufacture of an array of microreflectors.

2. Overcome some of the disadvantages of the silicon-based planar technology.

3. Manufacture of micro-devices using automated silicon technology for electronics.
4. Utilizing the cost-effective criteria of silicon and micromolding technologies.

DETAILED DESCRIPTION OF THE PREFERRED EMBODIMENT

Figure 1:
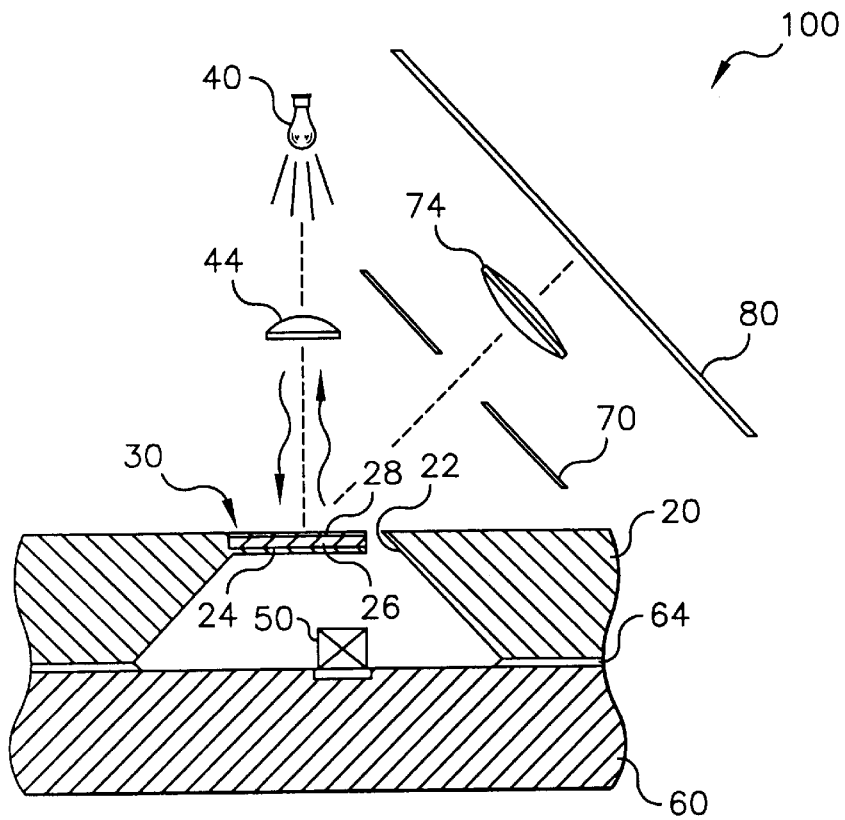
FIG. 1 is a partial section of the exemplary integrated hybrid microreflector with image projection optics and a light source with the beam in an undeflected position.

Referring to FIG. 1, there is shown a reflector 100 of the present invention in cross section. The etched silicon wafer 20 has an etched opening or cavity 22 and a cantilever beam 30 comprising unetched silicon 24, a hard magnetic coating 26 that is polarized along its length, and a reflective coating 28. A coating such as AlNiCo or Co—Pt having the desirable magnetic properties and a highly reflective characteristic as well may be substituted for 26 and 28. The details of these coatings will be described later. In the preferred embodiment of this invention, a radiation source 40, either monochromatic or polychromatic, provides light through a lens 44 and reflects back the same path when the cantilever beam 30 is held straight. A micro-electromagnet 50 is located on a second insulative substrate 60 wherein the substrate is preferably an electrically insulating ceramic like alumina or zirconia or a mixture thereof. The silicon wafer 20 is aligned and bonded to the insulative substrate 60 using conventional epoxy or other bonding agents at the interface 64.

Figure 2:
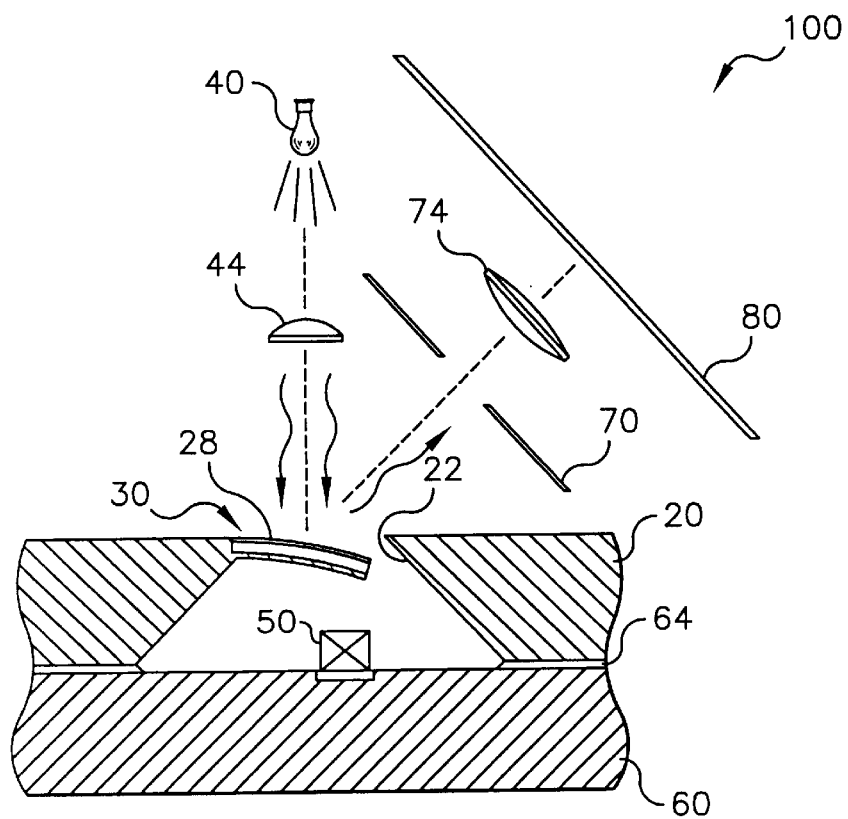
FIG. 2 is a partial section of the exemplary integrated hybrid microreflector with image projection optics and a light source with the beam in a deflected position.

Now referring to FIG. 2, there is shown the reflector of the present invention wherein the cantilever beam 30 is bent by the magnetic force generated by the micro-electromagnet 50 whereby the deflected beam is collected through a light stop 70 and a lens 74 and then on to the display screen 80.

Figure 3:
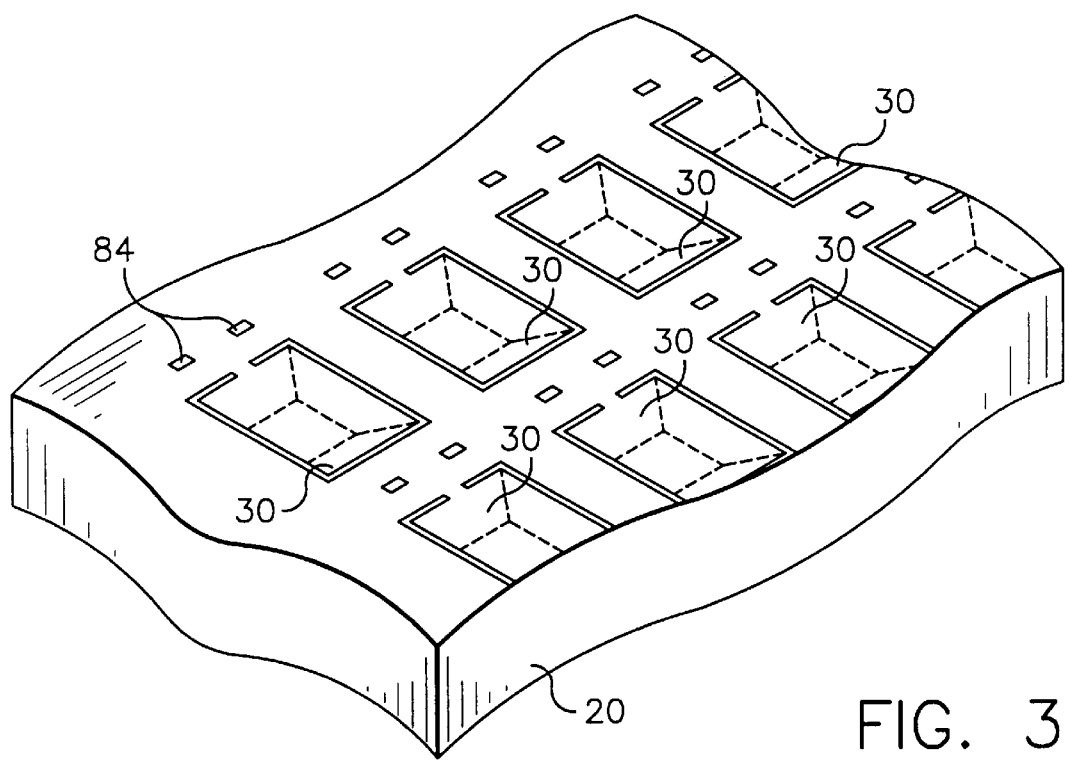
FIG. 3 is a partial section of the etched silicon wafer showing the cantilever beam.

Referring to FIG. 3, there is shown a fragmented view of an array of cantilever beams 30 in FIG. 1 with electrical pads 84 for connecting the micro-electromagnet 50 and other electronics. The cantilever beams 30 are generated by bulk micromachining of silicon wafer 20 using wet etching technique in conjunction with etch masks and etch stops (not shown). Anisotropic etchants of silicon such as potassium hydroxide, KOH, or ethylene-diamine and pyrocatecol (EDP), or hydrazine may be used which etch silicon wafers 20. Generation of this type of cantilever beams 30 and incorporating electronic circuitry is well known to the artisans. A reference for this well-known technique is set forth in Advances in Actuators, edited by A. P. Dorey and J. H. Moore, IOP Publishing Ltd. 1995, Silicon Microactuators in Chapter 7 by Mehran Mehregany.

Referring to FIGS. 1 and 2 again, the hard magnetic coating 26 is preferably made from cobalt-platinum (Co—Pt) which is deposited for in-plane polarization at room temperature using a PVD process such as dc or rf magnetron sputtering as described in the publication entitled "Structure and Micromagnetic Predictions for Hysterectic Pheomena in a Novel Co—Pt Permanent Magnet Thin Film", by R. H. Victora et al in the Journal of Magnet and Magnetic Materials, Vol 97, 1991, pp. 343–352. The hard magnetic coating 26 is polarized along the length of the cantilever beam 30, and preferably overcoated with a highly reflective coating 28 comprising gold, silver, aluminum, or alloys thereof, using a PVD process as well known to the artisans.

Figure 4:
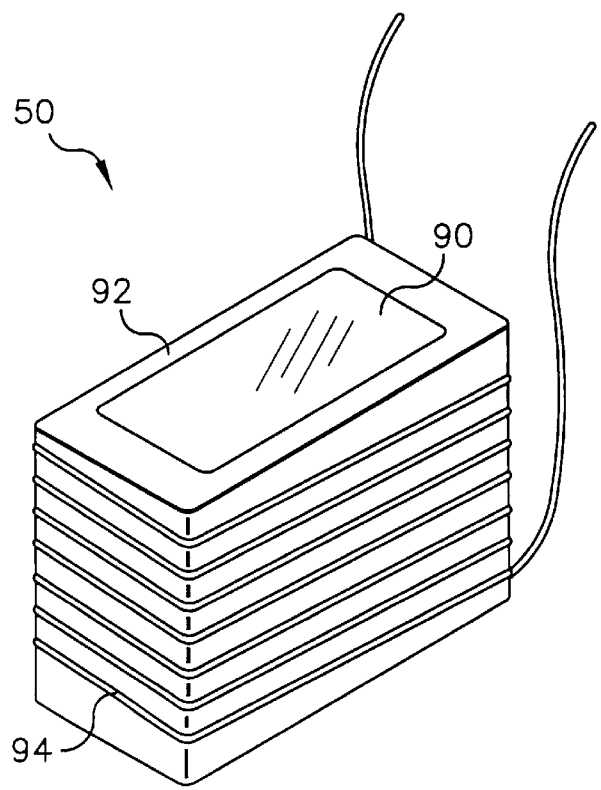
FIG. 4 is a perspective of a micromolded magnet in a ceramic enclosure.

Referring to FIG. 4, there is shown a perspective of an micro-electromagnet 50, wherein a micromolded hard magnet 90 is contained in a micro-molded insulating ceramic receptor 92 around which electrical coil 94 is wound. The micro-molded hard magnet 90 is preferably made from rare-earth materials such as NdFeB. Other hard ferromagnetic materials suitable for the present invention include SmCo, Ba-ferrite, Co—Pt, and the like. The physical dimensions of the micro-molded hard magnet 90 preferably have a depth less than 1 mm and length and width dimensions are each a maximum of 1 mm but greater than 0.1 mm.

The micro-molded insulating ceramic receptor 92 for the micromolded hard magnet 90 is preferably formed of alumina ceramic. Other insulating ceramic materials may include magnesia, zirconia, silica, titania, alumina-zirconia composite, alumina-silicate and the mixtures thereof. The preferred method of micromolding the micro-molded insulating ceramic receptor 92 is dry pressing. The ceramic selected for micromold insulating ceramic receptor 92 must be fabricated using very fine particles so that during the molding process defects due to particles pull-out is minimal. The selected ceramic particles must have an average grain size less than 1 $\mu$m. Furthermore, in its sintered state, the selected ceramic must be electrically insulating and also non-magnetic.

Figure 5:
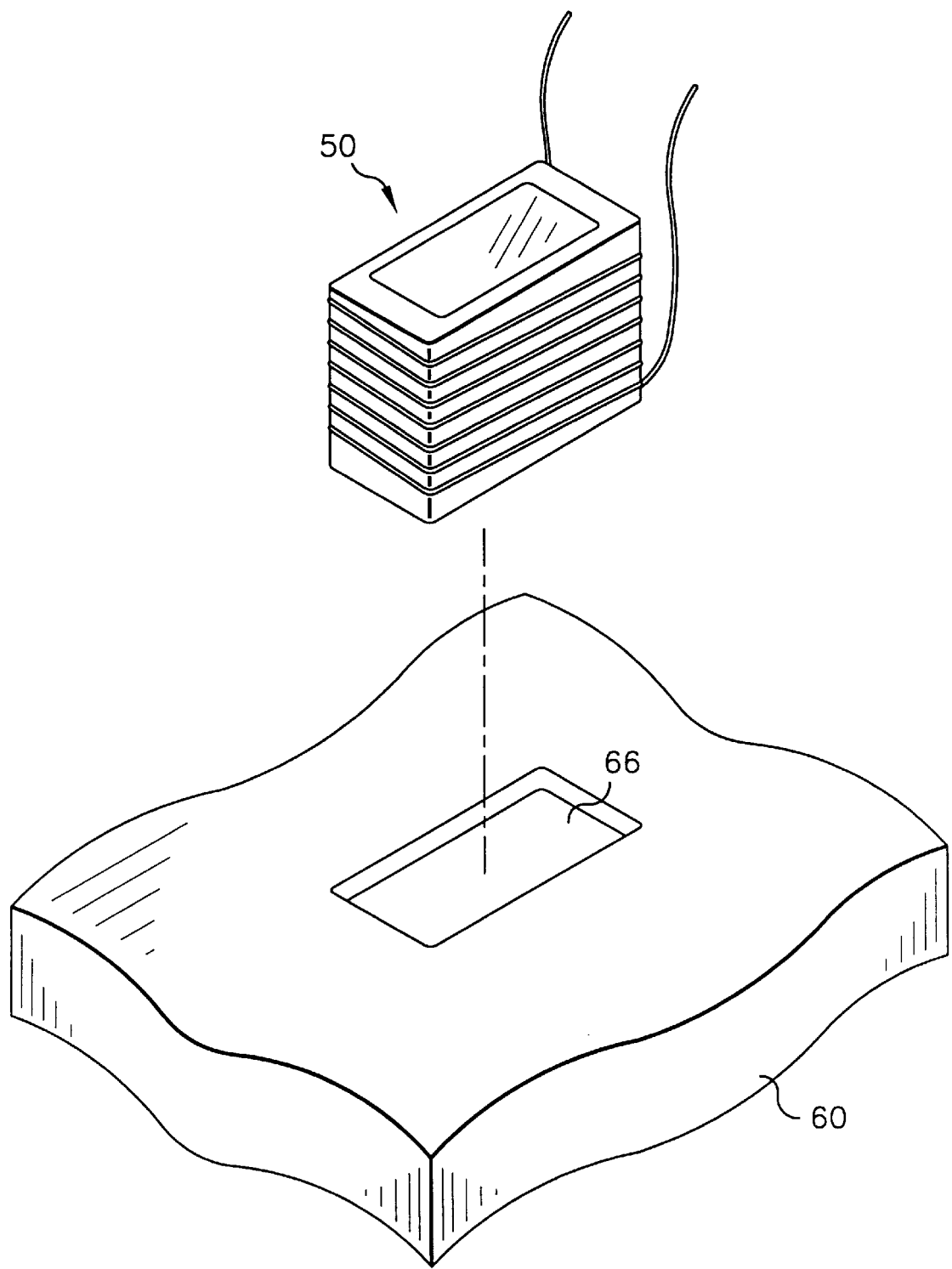
FIG. 5 is a perspective of the magnet in FIG. 4 positioned in the ceramic substrate.

Referring to FIG. 5, there is shown a perspective the assembly of the micro-electromagnet 50 on the insulative substrate 60 either by press fitting or using a conventional bonding agent.

The invention has been described in detail with particular reference to certain preferred embodiments thereof, but it will be understood that variations and modifications can be effected within the spirit and scope of the invention.

| PARTS LIST | |
|---|---|
| 20 | silicon wafer |
| 22 | etched opening |
| 24 | unetched silicon |
| 26 | hard magnetic coating |
| 28 | reflective coating |
| 30 | cantilever beams |
| 40 | radiation source |
| 44 | lens |
| 50 | micro-electromagnet |
| 60 | insulative ceramic substrate |
| 64 | interface |
| 70 | light stop |
| 74 | lens |
| 80 | display screen |
| 84 | electrical pads |
| 90 | micro-molded hard magnet |
| 92 | receptor |
| 94 | electrical coil |
| 100 | reflector |

What is claimed is:

1. A light reflective device comprising:

(a) an insulative substrate 60;

(b) a silicon wafer 20 positioned over the insulative substrate 60 and defining an opening 22 and having a flexible beam 30 portion having top and bottom surfaces which extend into the opening;

(c) a layer of ferromagnetic material formed over the top surface of the flexible beam portion;

(d) a reflector 28 formed over the ferromagnetic layer on the top surface of the flexible beam portion; and (e) a micro-electromagnet 50 mounted on the insulative substrate relative to the opening of the silicon wafer and adapted to produce a magnetic field in response to an applied current which acts on the ferromagnetic layer to cause the bending of the flexible beam portion, ferromagnetic layer and reflector.

2. The light reflective device of claim 1 wherein the insulative substrate is formed from alumina ceramic.

3. A method for making a light reflector comprising the steps of:

(a) providing an insulative substrate and mounting a micro-electromagnet on the insulative substrate;

(b) etching a silicon wafer to define an opening and a flexible beam portion having top and bottom surfaces which extend into the opening;

(c) forming a layer of ferromagnetic material over the top surface of the flexible beam portion;

(d) providing a reflector over the ferromagnetic layer on the top surface of the flexible beam portion; and (e) mounting the etched silicon wafer on the insulative substrate relative to the opening of the silicon wafer so that the micro-electromagnet produces a magnetic field in response to an applied current which acts on the ferromagnetic layer to cause the bending of the flexible beam portion, ferromagnetic layer and reflector.

* * * * *